Patented Feb. 5, 1935

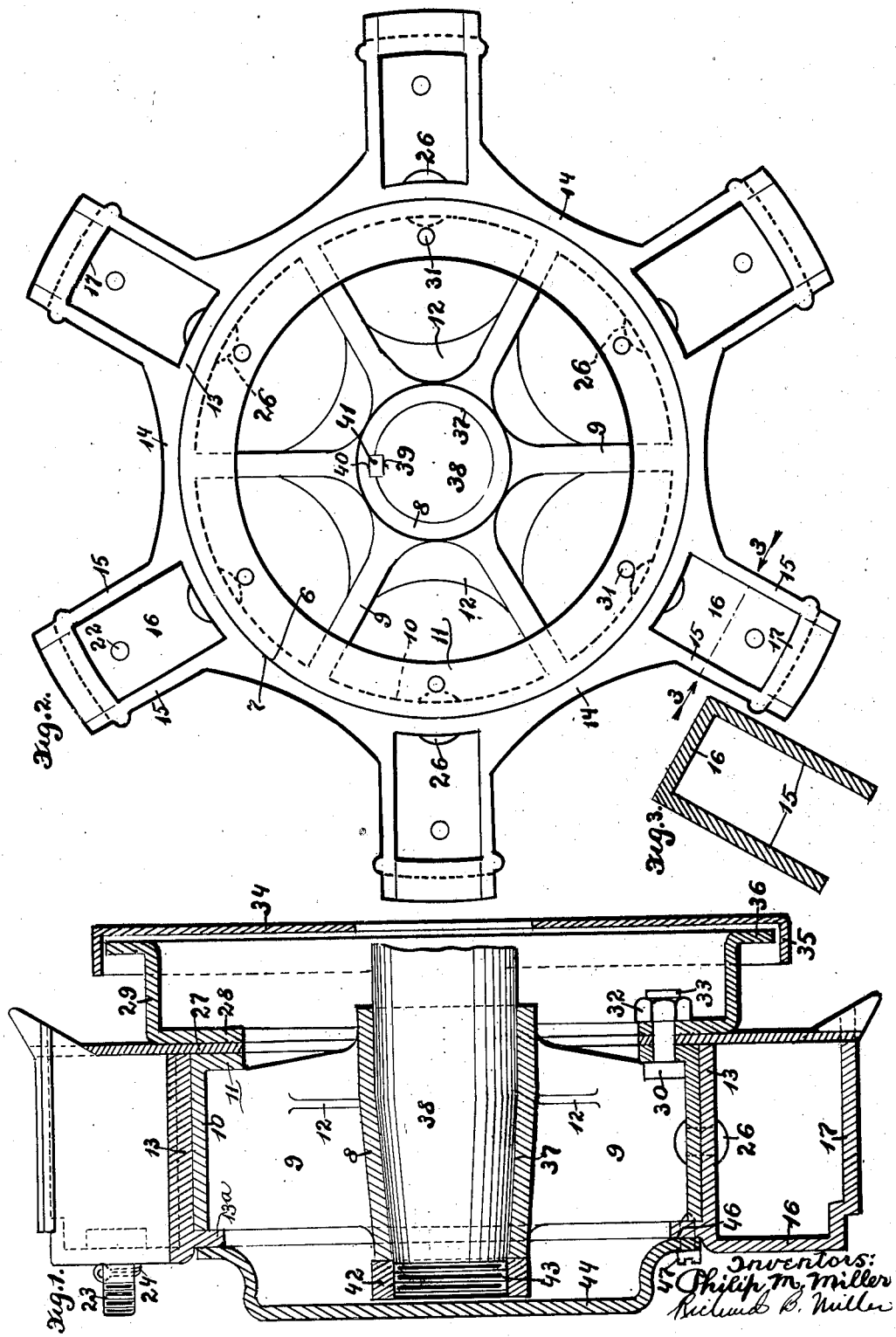

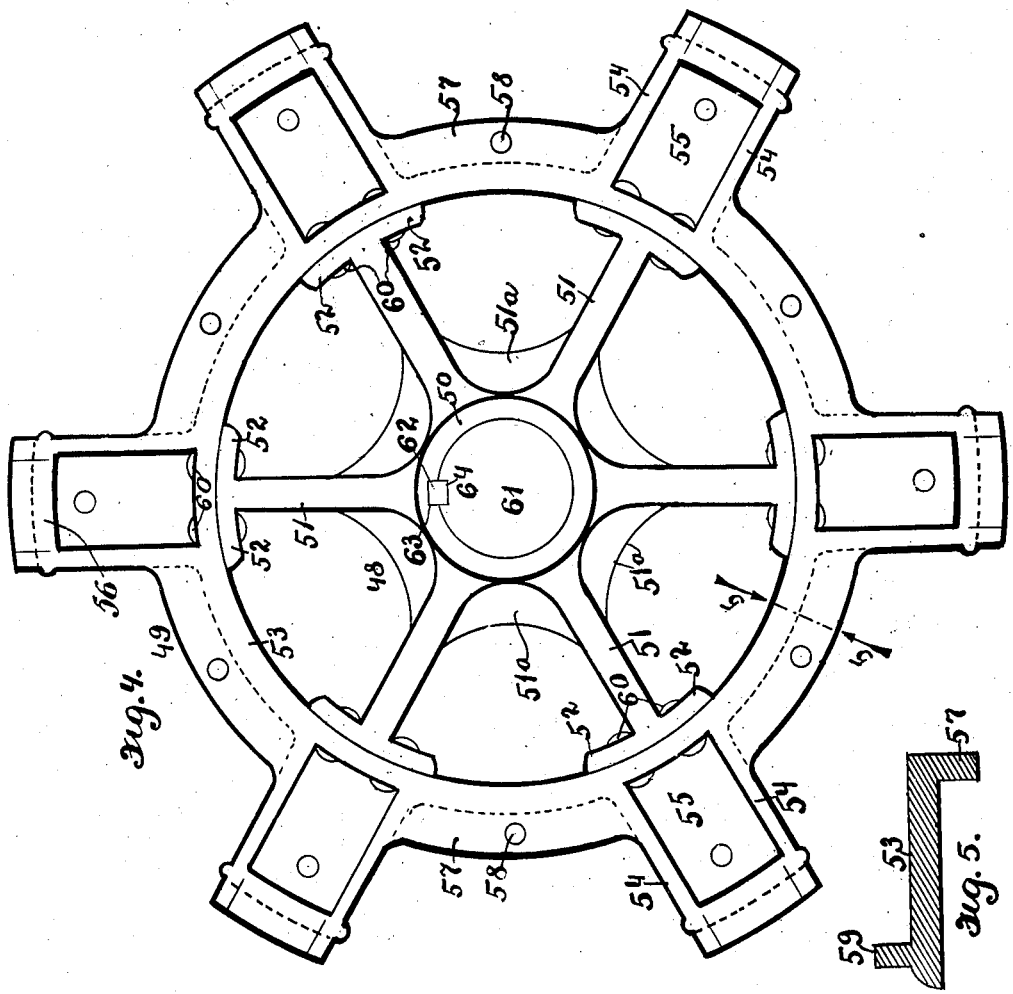

1,990,196

UNITED STATES PATENT OFFICE 1,990,196

VEHICLE WHEEL

Philip M. Miller and Richard B. Miller, Detroit, Mich.

Application December 11, 1931, Serial No. 580,360

5 Claims. (Cl. 301—65)

This invention relates broadly to wheels for motor vehicles and particularly to wheels of the cast metal type.

In the production of wheels from cast metal, one of the problems involved is to make the wheels sufficiently light for practical service while at the same time embodying adequate strength to withstand the arduous duties which they are called upon to perform, and this is particularly true with respect to wheels for heavy duty vehicles. In making a wheel of cast metal, another problem is to provide a hub construction for a driven wheel which can be keyed to a driven axle shaft without danger of breakage adjacent the keyed portion of the hub. It has heretofore been proposed to use hard metal liners of various types, but in cases where the central or nave portion of the wheel is of open or spider-like construction, not only must the hub barrel itself be reinforced, but it becomes highly desirable to reinforce the nave structure as a whole against torque and lateral thrust stresses.

The primary object of the present invention is to provide a cast metal wheel of that type having a nave portion of open, spider-like construction, preferably for the greater area of the wheel diameter, to permit the use of a spider member having a minimum amount of metal therein and relatively short spokes, wherein the nave member is possessed of relatively great strength capable of withstanding torque and lateral stresses, while the outer spoked spider member of the wheel may be made of relatively soft malleable metal.

Another object of the invention is to provide a wheel for motor vehicles of the cast metal artillery type having a nave portion of open, spider-like construction and a spider member of relatively soft or malleable metal wherein the nave member is capable of withstanding torque and lateral thrust stresses, but in the event of breakage, may be replaced without replacing the outer spoked spider member.

Another object of the invention is to provide a strong and durable cast metal artillery type wheel for heavy duty service having a nave member of open, spider-like construction adapted for use with the driven or rear axle of a truck, buss or other heavy duty vehicle and capable of effectively withstanding the severe torque and lateral thrust stresses to which it is constantly subjected.

The foregoing and other objects and advantages will become apparent in view of the following description taken in conjunction with the drawings, wherein:

Figure 1 is a substantially central cross sectional view of a wheel embodying the features of the invention;

Fig. 2 is a view in inboard side elevation of the nave and spider members in assembled relation, the brake drum, backing plate and the cover plates for the spokes being removed to better show the interior construction of the wheel;

Fig. 3 is a sectional view of one of the spokes, taken on the plane of section indicated at 3—3, Fig. 2;

Fig. 4 is a view similar to Fig. 2 of a modification in structure; and Fig. 5 is a section taken on the line 5—5, Fig. 4.

Referring first to Figs. 1 to 3, inclusive, the wheel as a whole comprises a nave member generally indicated at 6, and a spoked spider member generally indicated at 7. The nave member may be made of relatively hard metal such as forged or cast steel, while the outer spoked spider member is preferably made of relatively soft ductile metal such as a malleable iron, it being much more desirable to make this outer wheel member of such metal, since it adapts itself to easier working at the foundry and may be more readily machined at the assembly plant than cast or forged steel.

The nave member 6 is of open spider like construction and extends for the greater area of the wheel diameter, so that a spider member having relatively short spokes and embodying a minimum amount of metal may be used, thereby materially reducing the weight of the wheel. The nave member may be made of forged or cast steel or other relatively hard metal, so that it may be keyed to the driven axle of a vehicle without danger of breakage adjacent the keying portion and also with a minimum liability of breakage of the skeleton-like nave structure surrounding the hub.

The nave member 6 comprises a hub barrel having a series of ribs 9 formed integral with the periphery thereof and projecting radially therefrom and merging at their radial outer ends with a spider-supporting wall or felly 10, the inboard side of said wall being formed with a radially inwardly projecting flange 11 for attachment of a brake drum. Reinforcing webs 12 are preferably formed between the ribs 9 and merge with the latter and the hub barrel to reinforce the nave member against torque stresses.

The spider member is of the artillery type and comprises an annular body wall 13 having a central opening of a diameter such as will permit it to have a pressed fit on the wall or felly 10 of the nave member, the outboard side of the wall 13 having formed integrally therewith a radially inwardly projecting stop flange 13a which also serves for attachment of a hub or nave-covering shell, hereinafter referred to. The periphery of the wall 13 is preferably slightly arched as at 14 and has projecting radially therefrom a series of relatively short stubby spokes each defined by a side wall 15, a front wall 16 and a transverse end wall 17.

Rim clamping bolts 23 are inserted through holes 22 formed in the front wall 16 of the spokes, and are loosely retained in assembled relation with the spokes by means such as cotter keys 24.

In assembling, the felly wall 10 and/or the body wall 13 may be given such relative diameters, such as by a machining operation, as to provide a pressed fit between these parts, and to insure against separation suitable fastening members such as the rivets 26 are used to bind the walls 10 and 13 together, the said rivets 26 being preferably passed through the base wall of each spoke with the outer head of the rivet in the hollow or chambered portion of the spoke.

The inboard side of each spoke is preferably provided with a cover plate 27, each of said plates being clamped between the web flange 28 of the brake drum 29 and the flange 11, fastening bolts 30 being passed through holes 31 formed in the flange 11 and having nuts 32 threaded thereon, after which the inner ends of the bolts are preferably headed or peened over as at 33 to insure against separation of the parts. A backing plate 34 is also shown having a flange 35 which is telescoped over a radial flange 36 of the brake drum 29.

The hub 8 is formed with a bore 37 adapted to receive the outer end of an axle shaft 38, the end of the latter shaft being formed with a key-way 39 and the wall of the hub being formed with a coacting key-way 40 to receive a key 41 for splining the axle to the hub barrel. The threaded portion 43 of the axle shaft has applied thereon a nut 42 for preventing the wheel from becoming displaced laterally with respect to the said shaft.

A hub or nave covering shell 44, which may be made from sheet metal or like material and chrome plated or otherwise embellished, is provided and has its peripheral edge seated in a recess 46 formed in the flange 15 and secured to said flange by means of fillister screws 47.

Referring to Figs. 4 and 5, the nave member is generally indicated at 48 and the spider member is generally indicated at 49. In this instance, the hub barrel 50 is formed with a plurality of ribs 51 terminating in arcuate shaped T-heads 52, which serve the purpose of the wall 10 in Figs. 1 and 2. The spoked spider member 49 is formed with a body wall 53, note particularly Fig. 5, which has projecting radially therefrom a series of relatively short stubby spokes each defined by a side wall 54, a front wall 55 and an end wall 56. The inner side of the body wall 53 is formed with a flange 57 which serves to reinforce the spokes and spider body as a whole and also serves as a means for attaching the brake drum, which may be similar to that shown in Figs. 1 and 2, said flange being formed with a series of holes 58 to accommodate attachment of the drum. The outboard side of the wall 53 is formed with a radially inwardly projecting flange 59 for attachment of a hub or nave-covering shell which may also be similar to that shown in Figs. 1 and 2.

The method of assembling the nave member and the outer spoked spider member may be substantially similar to that heretofore described in connection with Figs. 1 and 2, rivets 60 being passed through the body wall 53 at the base of each spoke and also through the T-heads 52 of the ribs 51. An advantage of this construction is that the hard metal nave member may be more readily cast or forged and is lighter in weight than where a continuous felly wall is used, as in Figs. 1 and 2, although the reinforcing function of such wall is not present. The flange 57, however, functions to reinforce the body wall of the spider member in this instance.

An axle shaft 61 is shown in splined engagement with the hub 50, a key 62 being inserted in key-ways 63 and 64 formed in the hub barrel and shaft.

From the foregoing it will be seen that we have provided an improved type of all-metal wheel having features which facilitate production thereof and at the same time increase its strength and materially reduces its weight. Such wheels, while being particularly adapted for heavy duty service, may also be made sufficiently light for use with passenger vehicles. It will be understood that certain minor changes in structure and design may be adopted within the scope of the invention as defined by the appended claims.

We claim:

1. An artillery type metal wheel for motor vehicles comprising a nave member which is of open spider-like construction for the greater area of the wheel diameter to permit the use of a spider member having a minimum amount of metal therein and relatively short spokes, said nave member being formed in its entirety of relatively hard forged or cast metal in order to permit the hub of the nave to be keyed to an axle and together with the central nave body effectively withstand torque and lateral thrust stresses, the nave member being formed with spider-supporting means on its periphery, and a spider member of relatively soft malleable metal as compared with the nave member, said spider member being formed with an annular body wall adapted to fit on said means and a series of relatively short hollow radial projections defining the spokes of the wheel, and means extending radially through the base wall of each spoke and the spider-supporting means of said nave member for securing the parts in permanently assembled relation.

2. An artillery type metal wheel for motor vehicles comprising a nave member which is of open spider-like construction for the greater area of the wheel diameter to permit the use of a spider member having a minimum amount of metal therein and relatively short spokes, said nave member comprising a hub barrel and a series of radially extended ribs terminating in a transversely extended peripheral wall, the nave member in its entirety being formed of relatively hard forged or cast metal in order to permit the hub barrel to be keyed to an axle and together with the skeleton nave structure withstand torque and lateral thrust stresses, and a spider member of relatively soft malleable metal as compared with the nave member, said spider member being formed with an annular body wall having a central opening of such diameter as will provide a pressed fit on the peripheral wall of the nave member, said body wall being projected radially in arched formation in the form of relatively short hollow spokes, and means extending radially through the body wall of the spider member at the base of each spoke and the peripheral wall of said nave member for securing the parts in permanently assembled relation.

3. An artillery type metal wheel for motor vehicles comprising a nave member which is of open spider like construction for the greater area of the wheel diameter to permit the use of a spider member having a minimum amount of metal therein and relatively short spokes, said nave member being formed in its entirety of relatively hard forged or cast metal in order to permit the hub of the nave to be keyed to an axle and together with the central nave body effectively withstand torque and lateral thrust stresses, the periphery of the nave member being formed with a spider-supporting felly, and a spider member of relatively soft malleable metal as compared with the nave member, said spider member being formed with an annular body wall having a central opening of a diameter such as will adapt it to have a pressed fit on the felly of said nave member, the one side of said body wall being formed with a radially inwardly projecting stop flange to insure against lateral displacement of the parts, said body wall being formed with a series of relatively short radial hollow projections defining the spokes of the wheel, and means extending radially through the body wall of the spider member at the base of each spoke and the felly of said nave member for locking the parts in permanently assembled relation.

4. An artillery type metal wheel for motor vehicles comprising a nave member which is of open spider like construction for the greater area of the wheel diameter to permit the use of a spider member having a minimum amount of metal therein and relatively short spokes, said nave member being formed in its entirety of relatively hard forged or cast metal in order to permit the hub of the nave to be keyed to an axle and together with the central nave body effectively withstand torque and lateral thrust stresses, the periphery of the nave member being formed with a spider-supporting felly and a spider member of relatively soft malleable metal as compared with the nave member, said spider member being formed with an annular body wall having a central opening of a diameter such as will adapt it to have a pressed fit on the felly of said nave member, the one side of said body wall being formed with a radially inwardly projecting stop flange to insure against lateral displacement of the parts, said body wall being formed with a series of relatively short radial hollow projections defining the spokes of the wheel, means extending radially through the body wall of the spider member at the base of each spoke and said felly for locking the parts in permanently assembled relation, and a nave-covering shell detachably secured to said stop flange.

5. A two part artillery type metal wheel assembly for motor vehicles comprising a nave member of open spider like construction formed with a hub barrel and a series of ribs which project radially therefrom for the greater area of the wheel diameter and terminate in T-shaped head segments, said nave member being formed in its entirety of relatively hard forged or cast metal in order to permit the hub barrel to be keyed to an axle and together with the central nave body effectively withstand torque and lateral thrust stresses, and a spider member of relatively soft malleable metal as compared with the nave member, said spider member being formed with an annular body wall having a central opening of a diameter such as will permit the wall to snugly engage over the T-shaped head segments of the nave member, said body wall being projected radially in the form of relatively short hollow spokes, a series of rivets or analogous locking members extended radially through the wall of the spider member at the base of each spoke and through the said head segments to permanently lock the parts in assembled relation.

PHILIP M. MILLER.
RICHARD B. MILLER.